(12) United States Patent
Choi

(10) Patent No.: US 11,799,163 B2
(45) Date of Patent: Oct. 24, 2023

(54) BATTERY CELL CARRYING BOX

(71) Applicant: SK INNOVATION CO., LTD., Seoul (KR)

(72) Inventor: Seung Ryul Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 84 days.

(21) Appl. No.: 17/308,460

(22) Filed: May 5, 2021

(65) Prior Publication Data

US 2021/0351471 A1 Nov. 11, 2021

(30) Foreign Application Priority Data

May 7, 2020 (KR) .................. 10-2020-0054335

(51) Int. Cl.
*H01M 50/256* (2021.01)
*H01M 50/30* (2021.01)
*H01M 50/383* (2021.01)
*H01M 50/147* (2021.01)
*H01M 50/24* (2021.01)
*H01M 50/204* (2021.01)

(52) U.S. Cl.
CPC ....... *H01M 50/256* (2021.01); *H01M 50/147* (2021.01); *H01M 50/24* (2021.01); *H01M 50/383* (2021.01); *H01M 50/394* (2021.01); *H01M 50/204* (2021.01); *H01M 2200/00* (2013.01)

(58) Field of Classification Search
CPC .. H01M 50/256; H01M 50/147; H01M 50/24; H01M 50/383; H01M 50/394; H01M 50/204; H01M 50/231; H01M 50/258; H01M 50/282; H01M 50/291; H01M 50/367; H01M 50/30; H01M 10/658
See application file for complete search history.

(56) References Cited

U.S. PATENT DOCUMENTS

| | | | |
|---|---|---|---|
| 2008/0171259 A1* | 7/2008 | Kanai ................ | H01G 11/74 429/163 |
| 2009/0286138 A1* | 11/2009 | Shimamori ......... | H01M 10/613 429/53 |
| 2017/0294634 A1* | 10/2017 | Choi .................. | H01M 50/211 |
| 2020/0321592 A1* | 10/2020 | Motohashi ......... | H01M 50/172 |

(Continued)

FOREIGN PATENT DOCUMENTS

| | | |
|---|---|---|
| EP | 3790101 A1 | 3/2021 |
| JP | 2012-099432 A | 5/2012 |
| KR | 10-0852727 B1 | 8/2008 |

(Continued)

OTHER PUBLICATIONS

Extended European Search Report for the European Patent Application No. 21172130.3 issued by the European Patent Office dated Oct. 11, 2021.

*Primary Examiner* — Matthew T Martin
*Assistant Examiner* — Adam J Francis
(74) *Attorney, Agent, or Firm* — IP & T GROUP LLP

(57) ABSTRACT

The present invention relates to a battery cell carrying box in which battery cells are housed and which has a flame discharge port to discharge a flame when a certain battery cell housed in the carrying box burns, such that it is possible to prevent the flame from being propagated to adjacent battery cells and prevent the flame from being propagated to adjacent carrying boxes.

8 Claims, 12 Drawing Sheets

(56) References Cited

U.S. PATENT DOCUMENTS

2021/0074970 A1* 3/2021 Kim .................. H01M 50/3425

FOREIGN PATENT DOCUMENTS

| KR | 101404685 B1 * | 6/2014 |
| KR | 101404685 B1 | 6/2014 |
| KR | 10-2018-0024860 A | 3/2018 |
| KR | 10-2019-0008698 A | 1/2019 |
| KR | 10-1973741 B1 | 4/2019 |
| WO | 2020/152992 A1 | 7/2020 |
| WO | 2021/020003 A1 | 2/2021 |

* cited by examiner

BATTERY CELL CARRYING BOX

CROSS-REFERENCE TO RELATED APPLICATIONS

This application claims priority under 35 U.S.C. § 119 to Korean Patent Application No. 10-2020-0054335, filed on May 7, 2020 in the Korean Intellectual Property Office, the disclosure of which is incorporated herein by reference in its entirety.

TECHNICAL FIELD

The following disclosure relates to a battery cell carrying box, which may prevent, when battery cells are housed in carrying boxes and carried, a thermal runaway explosion in which heat and a flame caused by burning of a certain carrying box in which a battery cell is housed from being propagated to other surrounding carrying boxes.

BACKGROUND

In general, depending on the shape of an exterior material, lithium secondary batteries may be classified into a can type secondary battery in which an electrode assembly is embedded in a metal can, and a pouch type secondary battery in which an electrode assembly is embedded in a pouch-shaped exterior material which is an aluminum laminate sheet.

The lithium secondary battery has been widely used not only in a small-sized mobile device, but also in a middle-sized and large-sized device such as a vehicle or power storage device, and a plurality of battery cells such as pouch type secondary batteries that may be easily stacked and are light are connected at the time of use in order to increase capacity and power.

Such battery cells are accommodated in trays having a specific shape to be carried, and the trays in which the battery cells are accommodated are stacked and arranged in a carrying box and then carried. Here, an expanded polystyrene pad for absorbing shock may be interposed between the trays in which the battery cells are accommodated.

However, when any one of the battery cells housed in the carrying box burns, heat and a flame are propagated to other surrounding battery cells, and as a result, a thermal runaway explosion may occur. Further, a carrying box according to the related art is formed of a plastic material and does not have a structure capable of delaying or blocking the burning of a battery cell housed therein.

Therefore, when any one of the battery cell carrying boxes according to the related art in which the battery cell is housed burns, heat and a flame are propagated to other surrounding carrying boxes, and as a result, a thermal runaway explosion may occur.

SUMMARY

An embodiment of the present invention is directed to providing a battery cell carrying box, which may prevent, when battery cells are housed in carrying boxes and carried, a thermal runaway explosion in which heat and a flame caused by burning of a certain carrying box in which a battery cell is housed are propagated to other surrounding carrying boxes.

In one general aspect, a battery cell carrying box includes: a container-type case in which a concave housing space is formed to house battery cells therein; and a cover coupled to the case and covering an opening of the case, wherein a flame discharge port is formed in a side wall of the case, the flame discharge port penetrating through an inner portion and an outer portion of the side wall that is positioned on a side perpendicular to a direction in which the battery cells housed in the case are stacked.

The case may have a bottom wall and side walls extending upward along a circumference of the bottom wall, and the flame discharge port may be formed at a corner where the side walls meet each other.

The flame discharge port may be formed at a position adjacent to the bottom wall.

A plurality of flame discharge ports may be formed, and the flame discharge ports may be formed at positions opposite to each other with respect to a central portion surrounded by the side walls.

In the case and the cover, heat insulation members formed of a heat insulation material that blocks heat transfer may be formed on inner side wall surfaces that form the housing space, or between the inner side wall surfaces and outer side wall surfaces.

The heat insulation member may be formed of mica or glass fiber.

In the case and the cover, fire extinguishing members that discharge a fire extinguishing medium at a specific temperature or higher may be coated on inner side wall surfaces that form the housing space.

The fire extinguishing member may include a base member that forms an appearance, and capsules provided in the base member and in which the fire extinguishing medium is housed, and the fire extinguishing member may be formed so that the capsules burst at the specific temperature or higher to discharge the fire extinguishing medium.

A specific pattern having a concave portion and a convex portion may be formed on a surface of each of the case and the cover on which the fire extinguishing member is coated, and the concave portion of the pattern may be filled with the fire extinguishing medium.

The fire extinguishing member may be coated to cover the convex portion of the pattern.

In the case and the cover, heat insulation members formed of a heat insulation material that blocks heat transfer may be formed on inner side wall surfaces that form the housing space, and fire extinguishing members that discharge a fire extinguishing medium at a specific temperature or higher may be coated on inner side wall surfaces of the heat insulation members.

In the case and the cover, heat insulation members formed of a heat insulation material that blocks heat transfer may be formed between inner side wall surfaces that form the housing space and outer side wall surfaces, and fire extinguishing members that discharge a fire extinguishing medium at a specific temperature or higher may be coated on the inner side wall surfaces of the case and the cover that form the housing space.

In another general aspect, a battery cell housing structure includes: a cell tray in which an accommodation space is formed in an upper surface of the cell tray so as to be concave downward to accommodate a battery cell, and a vent channel penetrating through opposite surfaces of a partition wall surrounding side surfaces of the accommodation space is formed in the partition wall; the battery cell inserted into and accommodated in the accommodation space of the cell tray; and the battery cell carrying box described above, wherein cell-accommodated bodies in which the battery cells are accommodated in the cell trays are stacked in a vertical direction in the carrying box.

The vent channel of the cell tray may be arranged so as to face the flame discharge port of the carrying box.

Other features and aspects will be apparent from the following detailed description, the drawings, and the claims.

DETAILED DESCRIPTION OF MAIN ELEMENTS

Figure 1:
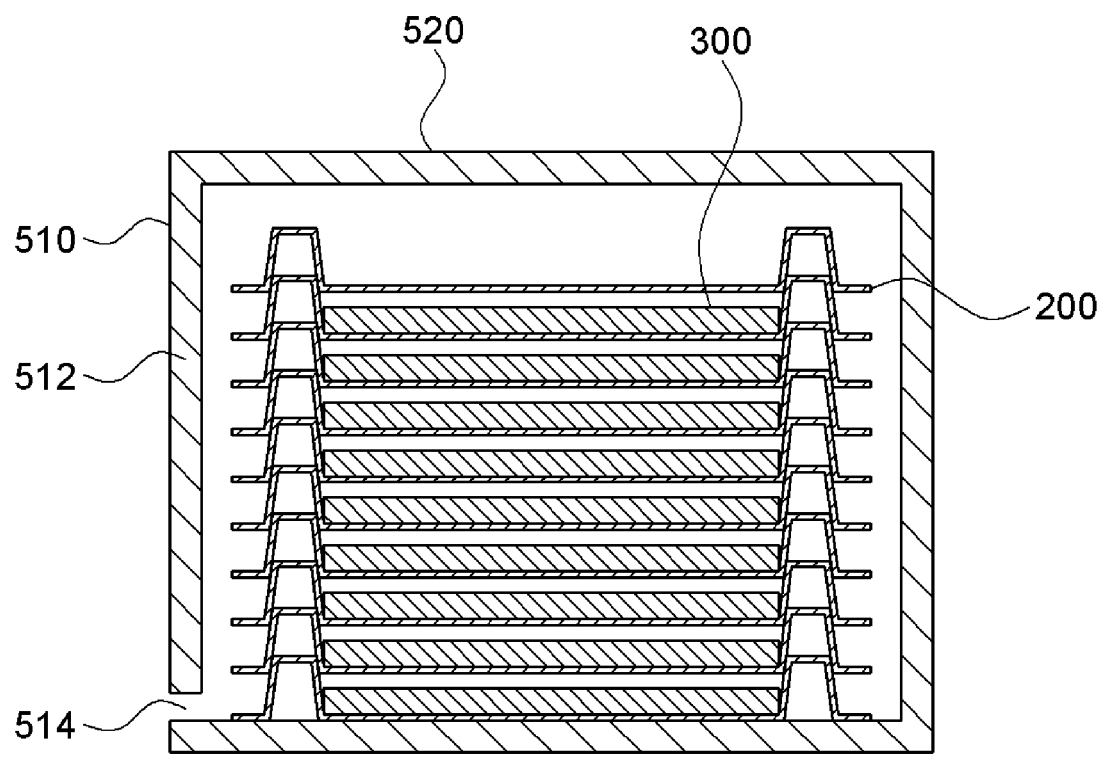
FIG. 1 is a cross-sectional view illustrating a battery cell carrying box in which battery cells and cell trays are stacked and housed according to an exemplary embodiment of the present invention.

200: Cell tray
210: Bottom wall
220: Partition wall
221: Vent channel
230: Accommodation space
300: Battery cell
500: Carrying box
501: Main member
502: Housing space
510: Case
511: Bottom wall
512: Side wall
513: Pattern
513a: Concave portion
513b: Convex portion
514: Flame discharge port
520: Cover
530: Heat insulation member
540: Fire extinguishing member
541: Base member
542: Capsule
600: Palette

DETAILED DESCRIPTION OF EMBODIMENTS

An exemplary embodiment of the present invention will be described in detail with reference to the accompanying drawings. The following detailed description is only illustrative and illustrates only some exemplary embodiments of the present invention.

Figure 2:
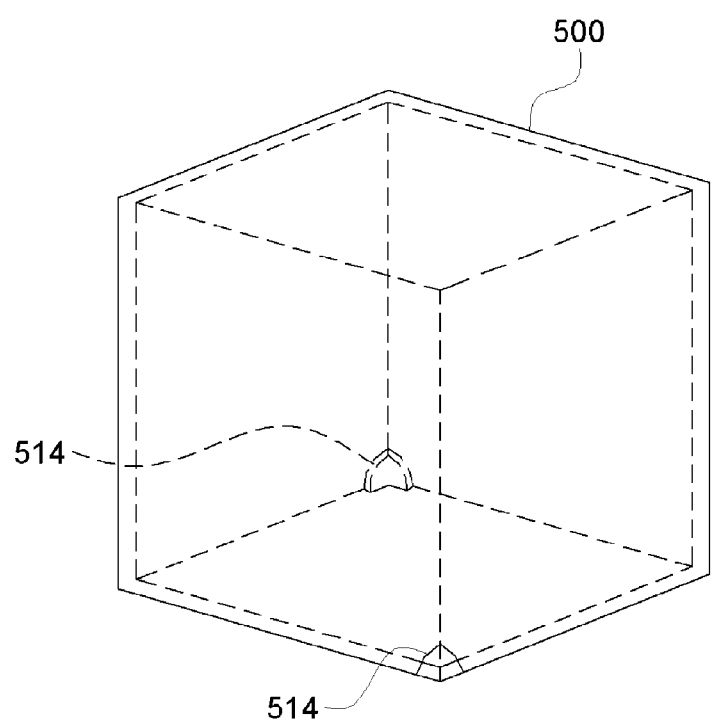
FIG. 2 is a perspective view illustrating the battery cell carrying box according to an exemplary embodiment of the present invention.

FIG. 1 is a cross-sectional view illustrating a battery cell carrying box in which battery cells and cell trays are stacked and housed according to an exemplary embodiment of the present invention, and FIG. 2 is a perspective view illustrating the battery cell carrying box according to an exemplary embodiment of the present invention.

Referring to FIGS. 1 and 2, a battery cell carrying box 500 according to an exemplary embodiment of the present invention may largely include a case 510 and a cover 520, and a flame discharge port 514 may be formed in the case 510.

In the case 510, an opening that is open upward to allow battery cells 300 to be housed therein may be formed, and a housing space 502 communicating with the opening may be formed so as to be concave downward. As an example, the case 510 may have a hexahedral shape whose upper surface is open, and side walls 512 of the case 510 may extend upward along a circumference of a bottom wall 511 that is formed parallel to a horizontal direction, such that all sides of the case 510 are surrounded by the side walls 512. Further, the case 510 may be formed of a material such as plastic. The case 510 may be formed in various other shapes and may be formed of various other materials. Further, the battery cells 300 may be inserted into and housed in the housing space 502 in the case 510.

Figure 3:
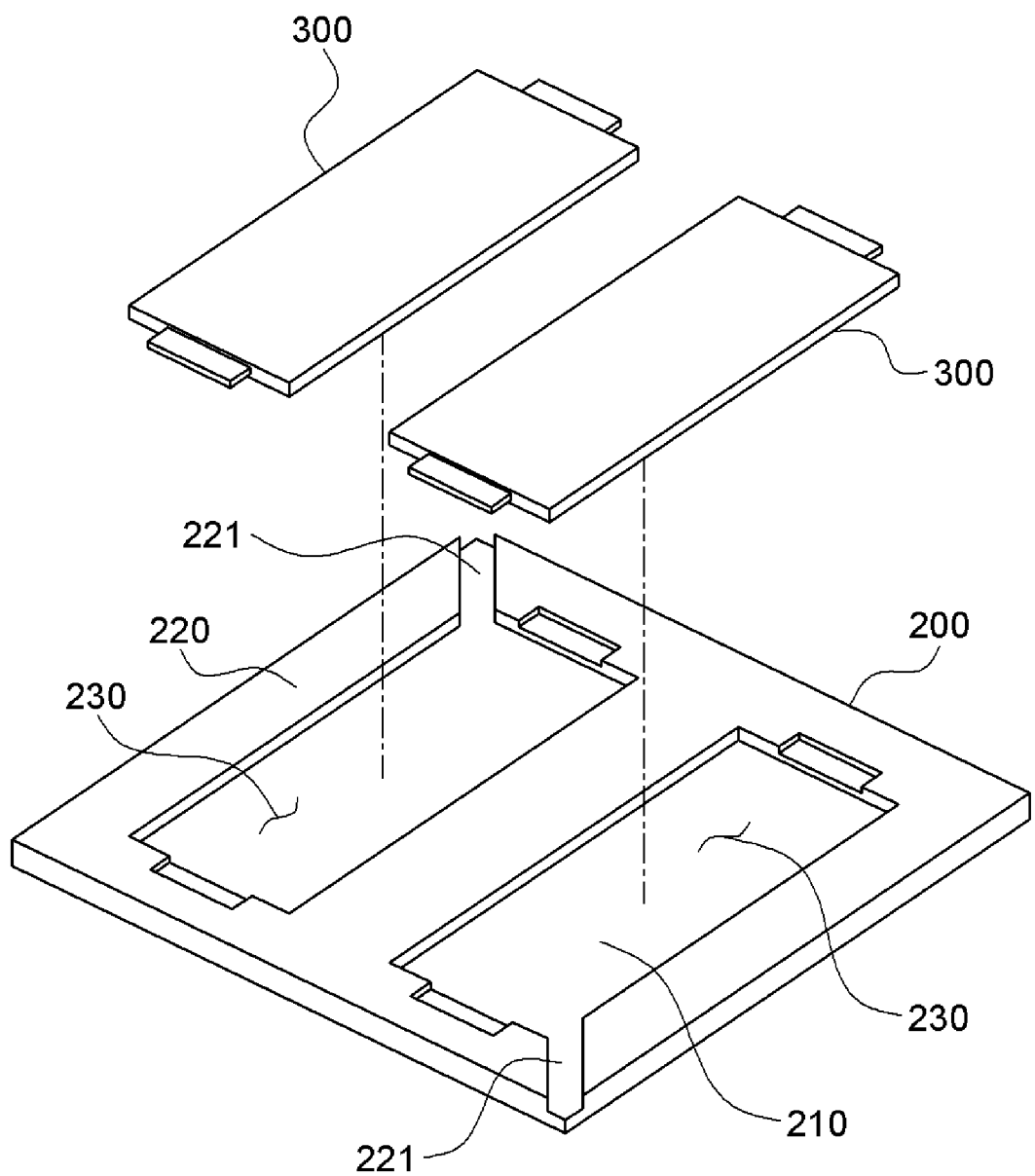
FIGS. 3 to 5 are perspective views illustrating a structure in which the battery cells are accommodated in the cell tray and a state in which the battery cells and the cell trays are stacked according to the present invention.
Figure 4:
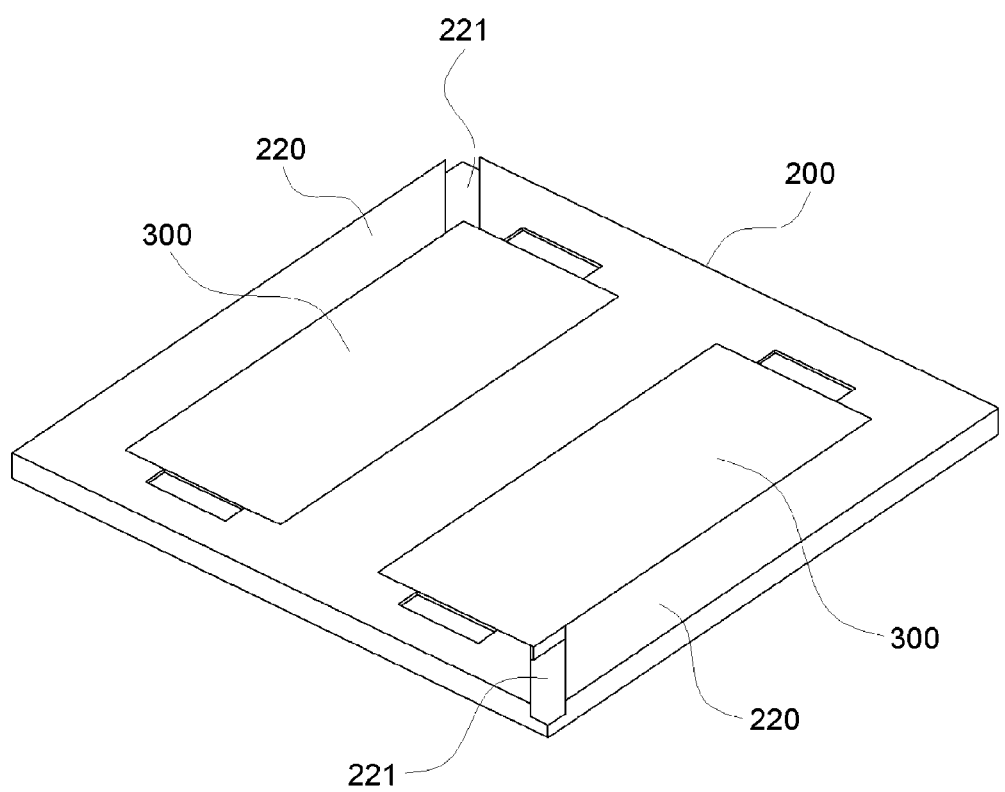
Figure 5:
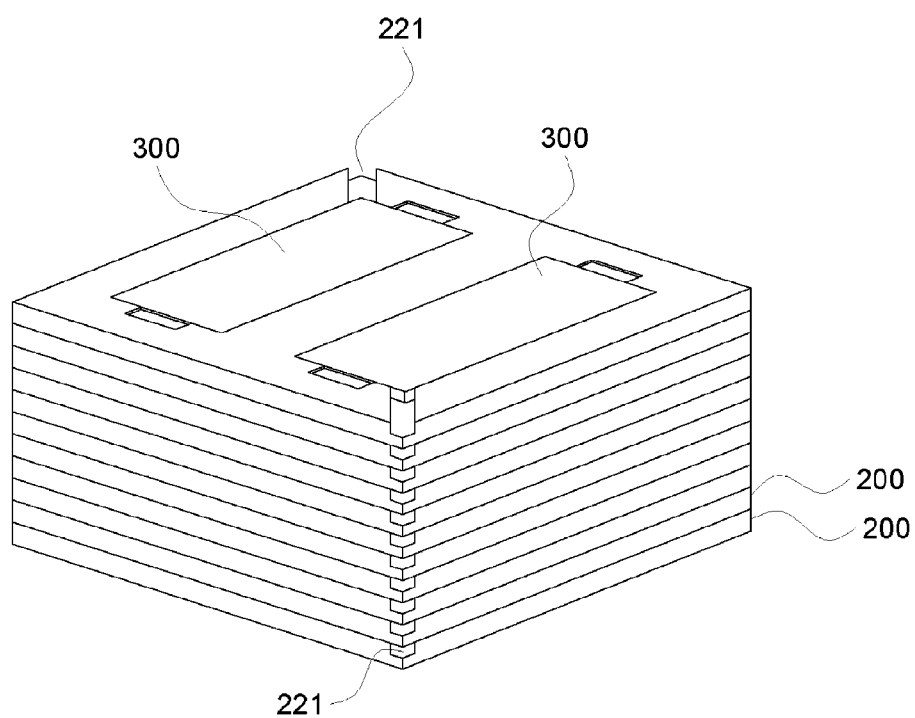

As an example, the battery cells 300 may be inserted into and accommodated in an accommodation space 230 of a cell tray 200 as illustrated in FIGS. 3 and 4. The accommodation space 230 may be formed in an upper surface of the cell tray 200 so as to be concave downward, and a partition wall 220 may extend upward from a bottom wall 210 so as to surround side surfaces of the accommodation space 230. In addition, a vent channel 221 penetrating through an outer side surface and an inner side surface may be formed in the partition wall 220 of the cell tray 200. As an example, a pair of accommodation spaces 230 are formed in the cell tray 200 as illustrated in the drawings, one battery cell 300 may be inserted into and accommodated in each accommodation space 230, and the vent channel 221 may be formed so as to communicate with each accommodation space 230. Here, the vent channel 221 may be formed on each of opposite sides in a diagonal direction. Further, a plurality of cell-accommodated bodies in which the battery cells 300 are accommodated in the cell trays 200 may be stacked in a height direction as illustrated in FIG. 5 and housed in the case 510.

The cover 520 may be coupled to an upper side of the case 510 and cover the upper opening of the case 510. Further, the cover 520 may have a flat plate shape that is parallel to the horizontal direction, and may be formed of a material such as plastic. The cover 520 may be formed in various other shapes and may be formed of various other materials.

Here, the flame discharge port 514 may be formed in the side wall 512 of the case 510, the flame discharge port 514 penetrating through an inner portion and an outer portion of the side wall 512 that is positioned on a side perpendicular to a direction in which the battery cells 300 housed in the case 510 are stacked. Here, the number of flame discharge ports 514 may be one, or a plurality of flame discharge ports 514 may be formed while being spaced apart from each other. The flame discharge port 514 may be formed at various positions on the side wall 512. The flame discharge port 514 may also be formed at a corner where two adjacent side walls 512 meet each other. Further, the flame discharge port 514 may be formed at a position that corresponds to a corner where two adjacent side walls 512 meet each other and is adjacent to the bottom wall 511. A plurality of flame discharge ports 514 may be formed, and the flame discharge ports 514 may be formed at positions opposite to each other with respect to a central portion surrounded by the side walls 512. That is, as illustrated in the drawings, the flame discharge ports 514 may be formed at opposite vertices in the diagonal direction on a plane. Here, the vent channel 221 of the cell tray 200 housed in the carrying box 500 may be formed and arranged so as to face the flame discharge port 514 of the carrying box 500.

Therefore, in the battery cell carrying box of the present invention, when one of the battery cells housed in the battery cell carrying box burns, the generated flame is induced toward the flame discharge portion formed in the carrying box and is discharged to the outside through the flame discharge port. Therefore, the propagation of the flame to the upper and lower sides of the burning battery cell may be delayed and blocked, such that it is possible to prevent the generated flame from being propagated to other adjacent battery cells in the carrying box, thereby preventing the thermal runaway explosion of the battery cells.

Figure 6:
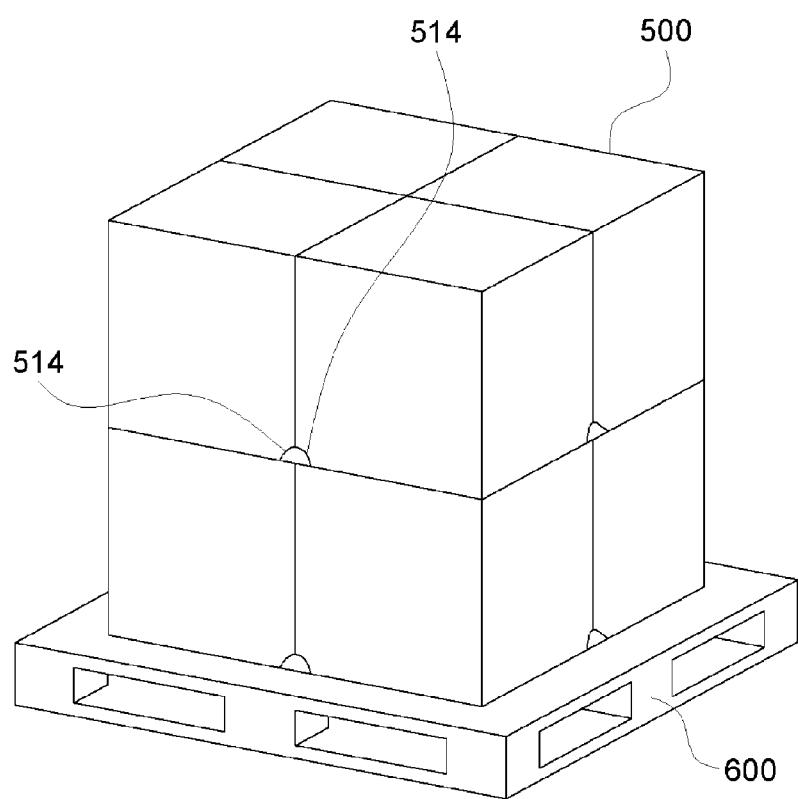
FIG. 6 is a perspective view illustrating a state in which a plurality of battery cell carrying boxes according to the present invention are arranged adjacent to each other and stacked.

FIG. 6 is a perspective view illustrating a state in which a plurality of battery cell carrying boxes according to the present invention are arranged adjacent to each other and stacked.

Referring to FIG. 6, the battery cell carrying boxes 500 according to the present invention in which the battery cells are provided may be loaded in rows and columns on a palette 600 to be carried, and the carrying boxes 500 may be stacked in the height direction. For example, as illustrated in FIG. 6, four carrying boxes 500 may be arranged adjacent to each other to form one layer, and four carrying boxes 500 may be stacked thereon so that the carrying boxes 500 are loaded in two layers. Here, the flame discharge ports 514 of adjacent carrying boxes 500 in each layer may be arranged adjacent to each other.

Therefore, in the battery cell carrying box of the present invention, the flame discharge port is formed in the carrying box in which the battery cells are housed. Therefore, when a battery cell in any one carrying box burns, it is possible to prevent a flame discharged through the flame discharge port from being propagated to battery cells in adjacent carrying boxes, thereby preventing the thermal runaway explosion of the battery cells.

Figure 7:
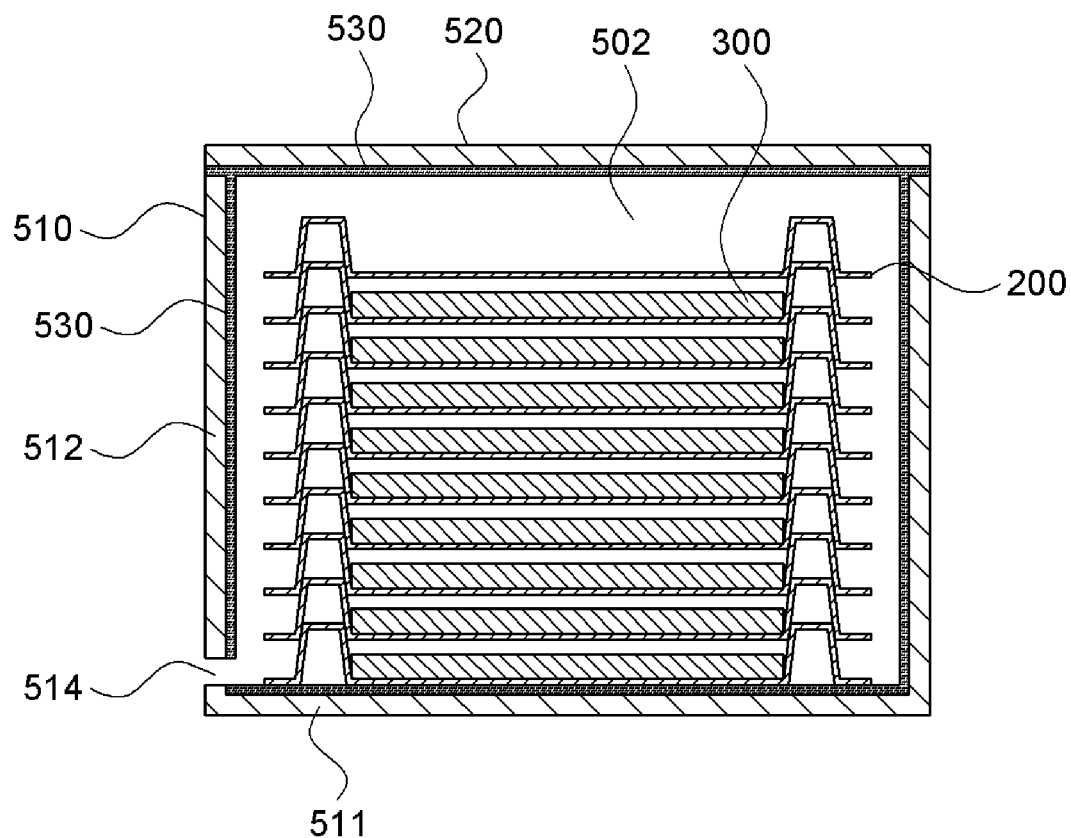
FIGS. 7 and 8 are cross-sectional views illustrating examples in which a heat insulation member is formed in the battery cell carrying box according to the present invention.
Figure 8:
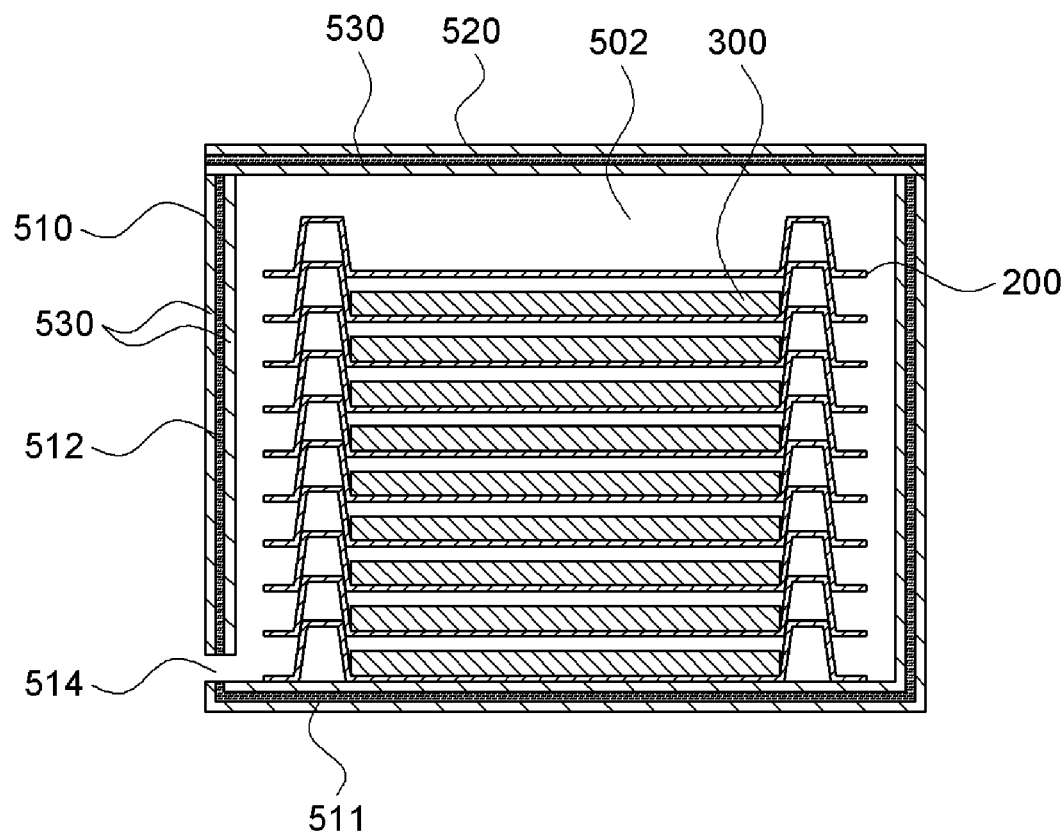

FIGS. 7 and 8 are cross-sectional views illustrating examples in which a heat insulation member is formed in the battery cell carrying box according to the present invention.

Referring to FIG. 7, in the case 510 and the cover 520, heat insulation members 530 formed of a heat insulation material capable of blocking heat transfer may be formed on inner side wall surfaces that form the housing space 502. As an example, the heat insulation members 530 may be formed on inner side surfaces of the bottom wall 511 and the side walls 512 of the case 510. Further, the heat insulation member 530 may also be formed on a lower surface of the cover 520. Therefore, the housing space 502 formed by coupling the case 510 and the cover 520 is surrounded by the heat insulation members 530, such that it is possible to prevent the carrying box 500 from being deformed or damaged due to a flame when the battery cell 300 in the carrying box 500 burns. Further, a flame generated in the carrying box 500 is discharged only through the flame discharge port 514 and is not discharged through other portions of the carrying box, such that it is possible to prevent the flame from being propagated to another carrying box adjacent to the carrying box in which the burning occurs.

Referring to FIG. 8, the heat insulation member 530 may also be formed between the inner side wall surface and an outer side wall surface of each of the case 510 and the cover 520. As an example, the case 510 and the cover 520 may be formed integrally with the heat insulation members 530 by putting the heat insulation member 530 into a mold and performing injection-molding when manufacturing the case 510 and the cover 520. In this way, the case 510 and the cover 520 may each have a three-layer structure in which the heat insulation member 530 is interposed between main members 501 included in the case 510 and the cover 520. Therefore, when the battery cell 300 in the carrying box 500 burns, the main member 501 on the inner side of the heat insulation member 530 of the carrying box 500 may be melt or burn and be deformed due to heat and a flame, but the heat insulation member 530 and the main member 501 on the outer side of the heat insulation member 530 are not deformed. As a result, the flame generated inside the carrying box 500 may be prevented from being discharged through other portions of the carrying box that are not the flame discharge port 514.

As an example, the heat insulation member 530 may be a heat insulation material formed of mica or glass fiber with an excellent fire resistance. Here, the mica and glass fiber are nonconductors with an excellent fire resistance, and thus may insulate electricity in addition to heat.

Figure 9:
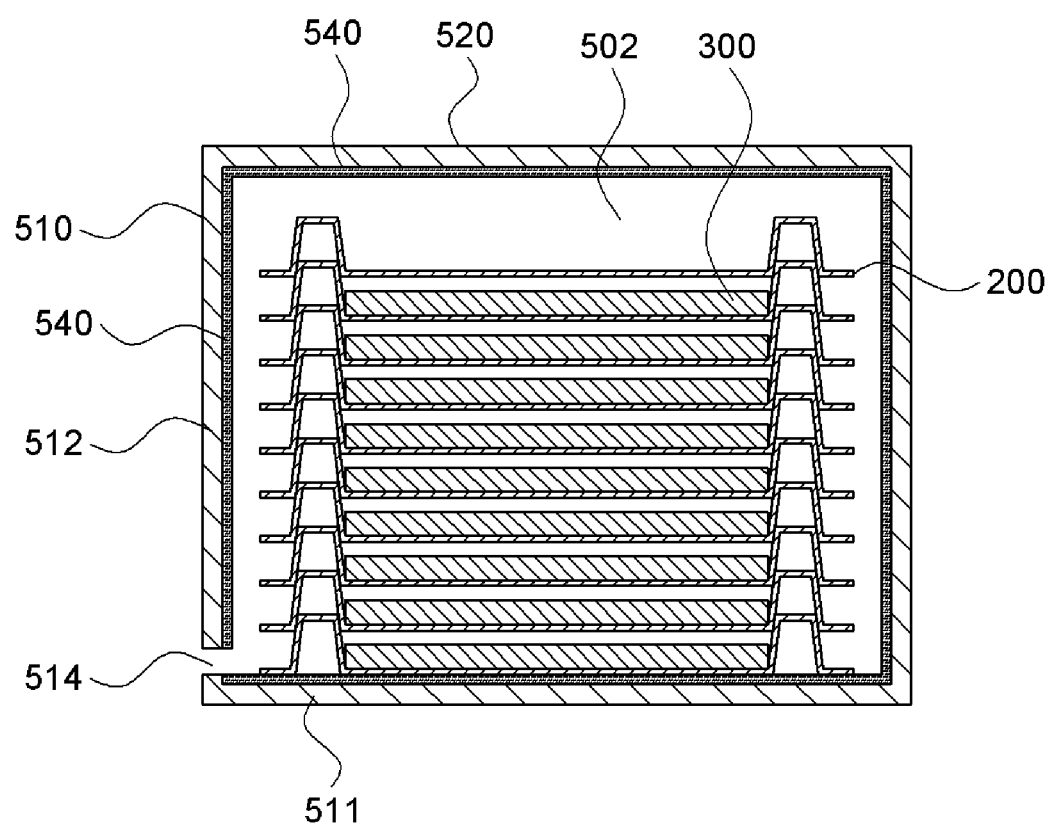
FIGS. 9 and 10 are cross-sectional views illustrating examples in which a fire extinguishing member is formed in the battery cell carrying box according to the present invention.
Figure 10:
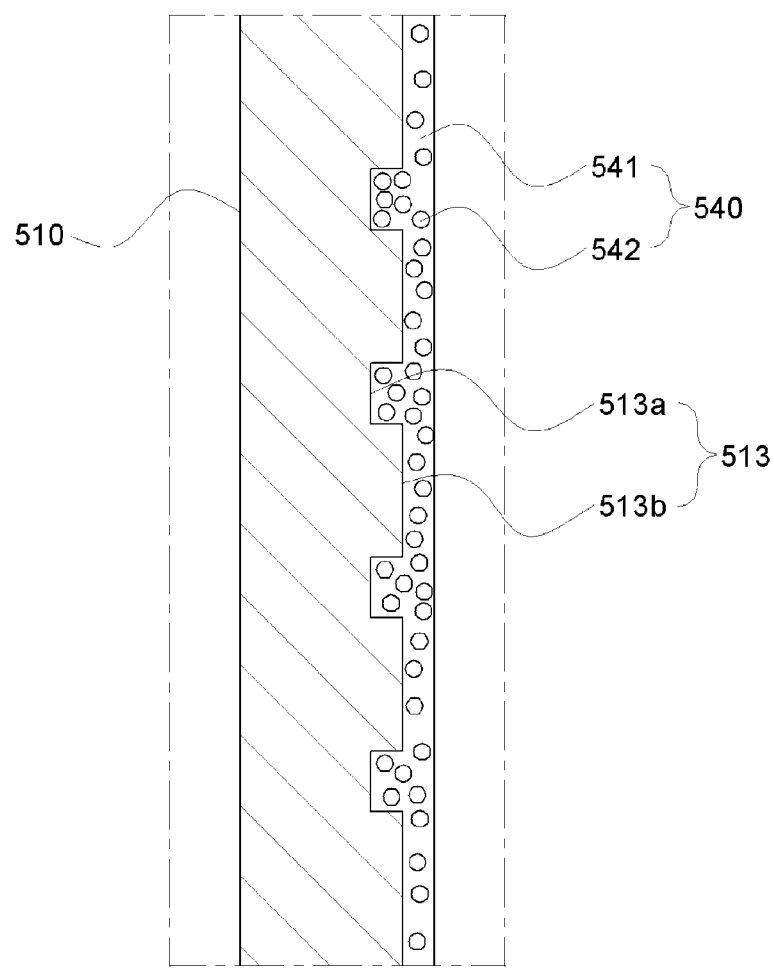

FIGS. 9 and 10 are cross-sectional views illustrating examples in which a fire extinguishing member is formed in the battery cell carrying box according to the present invention.

Referring to FIG. 9, in the case 510 and the cover 520, fire extinguishing members 540 capable of discharging a fire extinguishing medium at a specific temperature or higher may be coated on inner side wall surfaces that form the housing space 502. As an example, the fire extinguishing members 540 may be formed on inner side surfaces of the bottom wall 511 and the side walls 512 of the case 510. Further, the fire extinguishing member 540 may also be formed on the lower surface of the cover 520. Therefore, the housing space 502 formed by coupling the case 510 and the cover 520 is surrounded by the fire extinguishing members 540, and thus, when the battery cell 300 in the carrying box 500 burns and a flame is discharged through the flame discharge port 514, the fire extinguishing medium may be discharged from the fire extinguishing members 540 to extinguish the flame. Here, for example, the fire extinguishing member 540 may include a base member 541 and capsules 542 Further, the fire extinguishing member 540 may be formed by applying, onto the inner walls of the case 510 and the cover 520, a paint containing the base member 541 and the capsules 542 that burst at a specific temperature or higher to discharge the fire extinguishing medium. Therefore, the base member 541 may form the appearance of a coating layer formed using the fire extinguishing member 540, and the capsules 542 may be incorporated or contained in the base member 541. The fire extinguishing member 540 may be formed in various other shapes and may be formed by various other methods.

Referring to FIG. 10, a pattern 513 is formed in the surface of each of the case 510 and the cover 520 on which the fire extinguishing member 540 is coated, and the fire extinguishing member 540 may be coated so that a concave portion 513*a* of the pattern 513 is filled with the fire extinguishing member 540. Here, the fire extinguishing member 540 may be coated so as to cover a convex portion 513*b* of the pattern 513. That is, as illustrated in FIG. 10, the pattern 513 having a specific shape in which the relatively concave portion 513a and the relatively convex portion 513b are provided may be formed on the inner side surface of each of the case 510 and the cover 520. Therefore, when the fire extinguishing member 540 is coated on the inner side surface of each of the case 510 and the cover 520, the fire extinguishing member 540 may be coated so that the concave portion 513a is filled with the fire extinguishing member 540, and at the same time, the convex portion 513b is covered with the fire extinguishing member 540. Here, the concave portion 513a and the convex portion 513b of the pattern 513 may have various shapes. In this case, the contact area of the surface on which the fire extinguishing member 540 is coated may be increased, such that it is possible to prevent the fire extinguishing member 540 from being separated from the case 510 and the cover 520. In addition, a larger amount of the fire extinguishing member 540 may be coated within a predetermined thickness range and a predetermined area range, and thus, it is possible to improve fire extinguishing performance for the burning of the battery cell.

Figure 11:
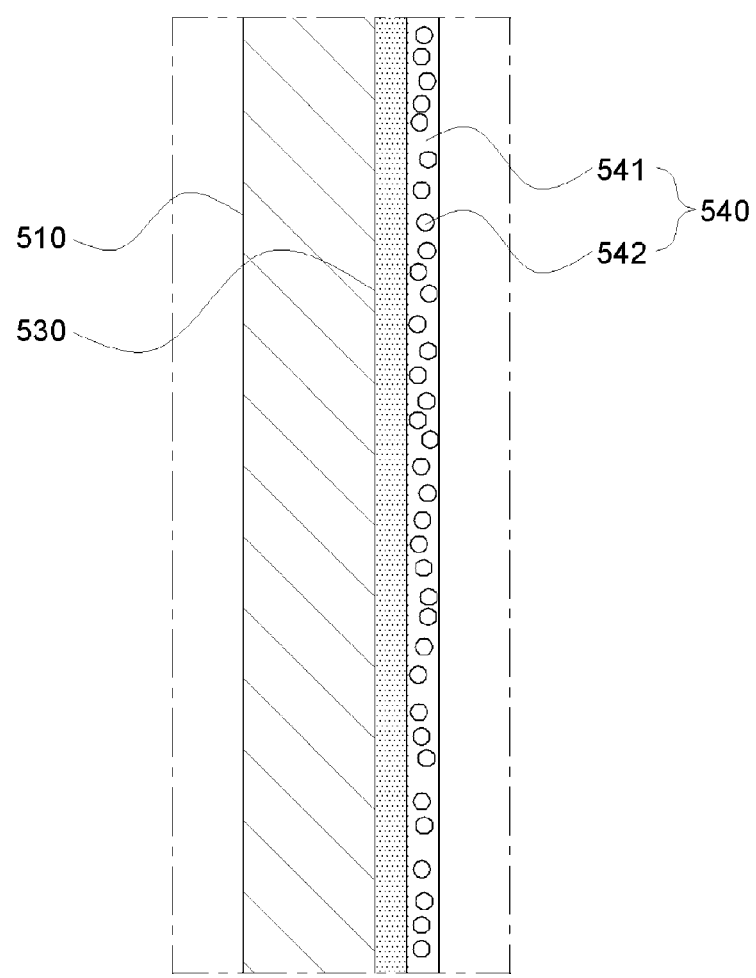
FIGS. 11 and 12 are cross-sectional views illustrating examples in which the heat insulation member and the fire extinguishing member are formed in the battery cell carrying box according to the present invention.
Figure 12:
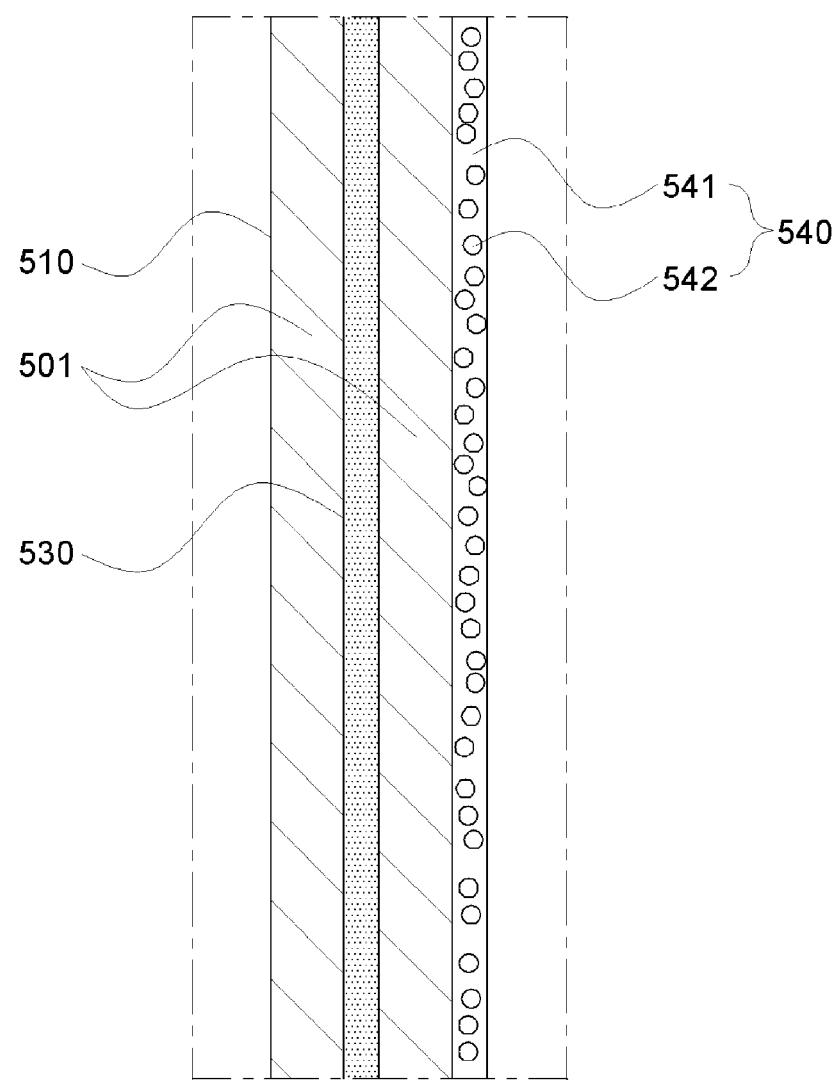

FIGS. 11 and 12 are cross-sectional views illustrating examples in which the heat insulation member and the fire extinguishing member are formed in the battery cell carrying box according to the present invention.

Referring to FIG. 11, in the case 510 and the cover 520, the heat insulation members 530 formed of a heat insulation material capable of blocking heat transfer may be formed on the inner side wall surfaces that form the housing space 502, and the fire extinguishing members 540 capable of discharging the fire extinguishing medium at a specific temperature or higher may be coated on inner side surfaces of the heat insulation members 530. Further, both of the heat insulation member 530 and the fire extinguishing member 540 may be formed on the case 510 and the cover 520. Here, the case 510 and the cover 520 may each have a three-layer structure in which the heat insulation member 530 is formed on an inner side surface of the main member 501 included in the case 510 and the cover 520, and the fire extinguishing member 540 is coated on the inner side surface of the heat insulation member 530.

Referring to FIG. 12, both of the heat insulation member 530 and the fire extinguishing member 540 are formed on the case 510 and the cover 520, but unlike those of FIG. 11 described above, the heat insulation member 530 may be formed between the main members 501 included in the case 510 and the cover 520 to form a three-layer structure, and the fire extinguishing member 540 may be coated on the inner side surface of each of the case 510 and the cover 520 to form a four-layer structure.

For reference, the battery cell 300 may have a rectangular plate shape whose length and width are larger than the thickness thereof. Although not illustrated, the battery cell 300 may be a pouch type secondary battery in which an electrode assembly including a positive plate and a negative plate alternately stacked in a thickness direction with a separator interposed therebetween is housed and sealed in a pouch-shaped exterior material, and the pouch-shaped exterior material is filled with an electrolyte. Further, in the battery cell 300, electrode tabs connected to the positive plates and the negative plates may be exposed to the outside of the pouch-shaped exterior material, and for example, the electrode tabs may be exposed at opposite side surfaces of the battery cell 300 in a length direction. The battery cell may have various other forms. Further, the battery cell 300 may have a form in which a sealing portion of a pouch, which is an exterior material, protrudes from a side surface in a lateral direction or longitudinal direction, or protrudes from the side surface in the lateral direction or longitudinal direction and is bent. Such a battery cell 300 may be inserted into and accommodated in the cell tray 200. Further, a plurality of assemblies in which the battery cells 300 are accommodated in the cell trays 200 may be stacked in a vertical direction and housed in the carrying box 500.

The battery cell carrying box according to the present invention may suppress, when a certain carrying box in which battery cells are housed burns at the time of carrying the battery cells, heat and a flame from being propagated to other surrounding carrying boxes, thereby preventing a thermal runaway explosion of the battery cells.

Although the present invention has been described and illustrated based on the exemplary embodiments for describing the principle of the present invention, the present invention is not limited to the configurations and actions illustrated and described above. Those skilled in the art will appreciate that various modifications and alterations may be made without departing from the spirit or essential feature of the present invention. Therefore, it is to be understood that the exemplary embodiments described above are illustrative rather than being restrictive in all aspects. It is to be understood that the scope of the present invention will be defined by the claims and all modifications and alterations derived from the claims and their equivalents are included in the scope of the present invention.

What is claimed is:

1. A battery cell carrying box comprising:
   a container-type case in which a concave housing space is formed to house battery cells therein; and
   a cover coupled to the case and covering an opening of the case,
   wherein a flame discharge port is formed in a side wall of the case, the flame discharge port penetrating through an inner portion and an outer portion of the side wall that is positioned on a side perpendicular to a direction in which the battery cells housed in the case are stacked,
   wherein in the case and the cover, fire extinguishing members that discharge a fire extinguishing medium at a specific temperature or higher are coated on inner side wall surfaces that form the housing space,
   wherein a specific pattern having a concave portion and a convex portion is formed on a surface of each of the case and the cover on which the fire extinguishing member is coated, and the concave portion of the specific pattern is filled with the fire extinguishing member, and
   wherein the fire extinguishing member is coated to cover the convex portion of the specific pattern.

2. The battery cell carrying box of claim 1, wherein the case has a bottom wall and side walls extending upward along a circumference of the bottom wall, and
   the flame discharge port is formed at a corner where the side walls meet each other.

3. The battery cell carrying box of claim 2, wherein the flame discharge port is formed at a position adjacent to the bottom wall.

4. The battery cell carrying box of claim 2, wherein a plurality of flame discharge ports are formed, and
   the flame discharge ports are formed at positions opposite to each other with respect to a central portion surrounded by the side walls.

5. The battery cell carrying box of claim 1, wherein in the case and the cover, heat insulation members formed of a heat insulation material that blocks heat transfer are formed on inner side wall surfaces that form the housing space, or between the inner side wall surfaces and outer side wall surfaces.

6. The battery cell carrying box of claim 5, wherein the heat insulation member is formed of mica or glass fiber.

7. The battery cell carrying box of claim 1, wherein in the case and the cover, heat insulation members formed of a heat insulation material that blocks heat transfer are formed on inner side wall surfaces that form the housing space, and fire extinguishing members that discharge a fire extinguishing medium at a specific temperature or higher are coated on inner side wall surfaces of the heat insulation members.

8. The battery cell carrying box of claim 1, wherein in the case and the cover, heat insulation members formed of a heat insulation material that blocks heat transfer are formed between inner side wall surfaces that form the housing space and outer side wall surfaces, and fire extinguishing members that discharge a fire extinguishing medium at a specific temperature or higher are coated on the inner side wall surfaces of the case and the cover that form the housing space.

\* \* \* \* \*